April 22, 1924.
M. G. HUBBARD
VALVE MECHANISM FOR STEAM RADIATORS
Original Filed Jan. 14, 1920    2 Sheets-Sheet 2.
1,491,533
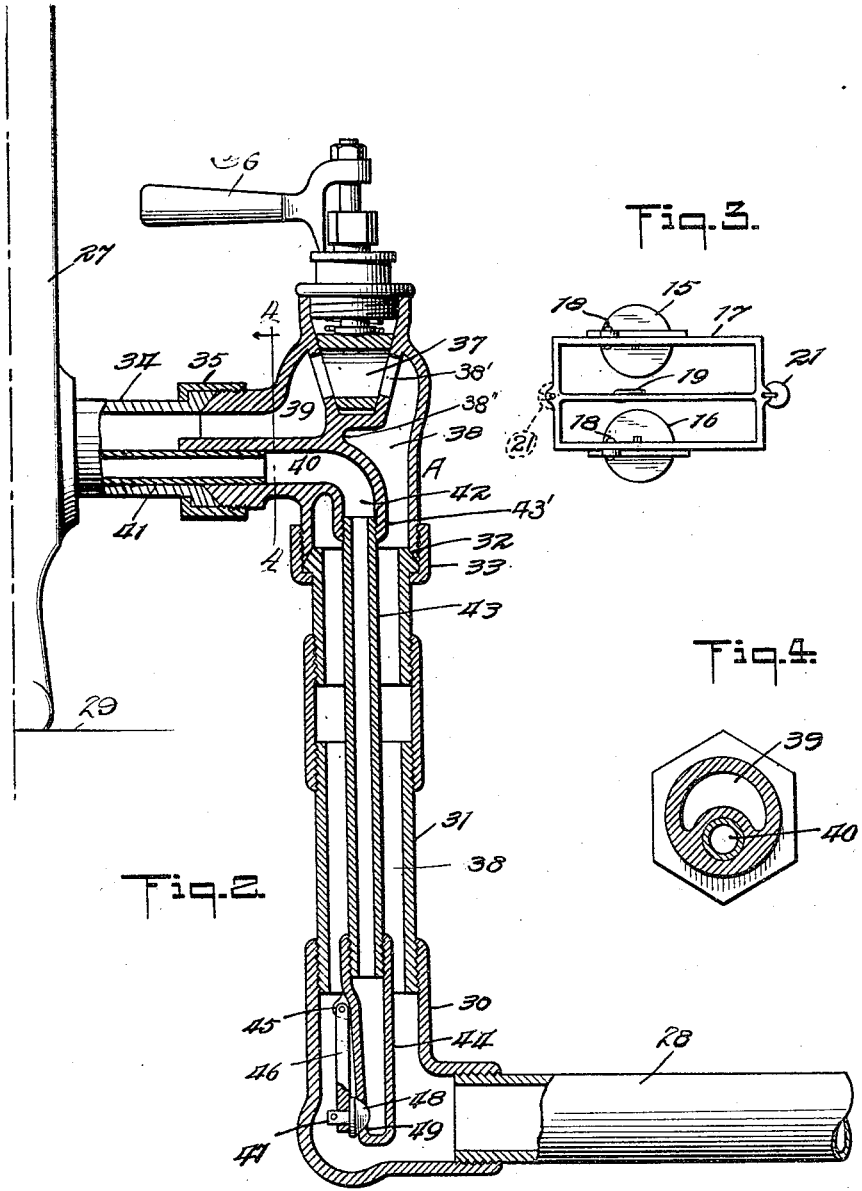
INVENTOR
BY
ATTORNEYS Patented Apr. 22, 1924.

1,491,533

UNITED STATES PATENT OFFICE.

MOSES G. HUBBARD, OF CHATHAM, NEW JERSEY.

VALVE MECHANISM FOR STEAM RADIATORS.

Application filed January 14, 1920, Serial No. 351,415. Renewed February 28, 1924.

*To all whom it may concern:*

Be it known that I, MOSES G. HUBBARD, a citizen of the United States, residing at Chatham, county of Morris, and State of New Jersey, have invented certain new and useful Improvements in Valve Mechanisms for Steam Radiators, of which the following is a full, clear, and concise description.

My invention relates to improvements in steam heating systems, and to a valve mechanism designed more particularly for use in such systems.

This application is restricted, in response to a requirement of division made by the Patent Office, to a valve mechanism for such systems.

The most common steam heating system uses radiators whose sections are connected at the bottom only. These radiators are provided with thermostatic valves which permit air to enter or to pass out of the radiator while preventing the escape of steam, and are connected to the steam mains by a single pipe through which the steam and condensate both flow, valves being located near the radiators to open or close the steam passage to this pipe. With radiators so connected, it is practically impossible to vary the surface subjected to the steam, or to secure modulation. The radiator when functioning must be subjected to the full pressure of the steam line, else the water will not flow back from the radiator into the pipe. This is the cheapest system to install, but it is expensive to operate, and by no means entirely satisfactory.

Another common system, known as a modulating system, designed to be operated by vapor, uses radiator sections connected at both top and bottom, at a cost of about 30% more per section. Owing to the lower heat value of the vapor, the radiators must have about 50% more sections than those for use in a single pipe pressure system. A return line with thermostatic valves and other special fittings, pumps, etc., must be provided to return the condensate.

All of these parts, taken together, require about twice the investment that the single pipe system would require. The system is, however, more economical and satisfactory in operation.

The principal object of my invention is to bring together the advantages of the two systems, so that the economical and satisfactory operation of the modulating system may be had from an investment which is substantially that for a single pipe system. In fact, I can use the same kind and size of radiator, and same size and amount of piping, as is used in the single pipe system, and can install it at the same expense for labor.

Another object of my invention is to provide such a mechanism that, without change in boiler or radiators, the intense heat of live steam, or the mild heat of low pressure vapor, may be had at will, and also such a mechanism that the supply of vapor may be modulated.

Another object of my invention is to so design and arrange the parts that they may be incorporated in existing single pipe systems by the substitution of a small number of new parts.

In the accompanying drawings forming part of this specification, I have shown a preferred embodiment of my invention. I realize that this is but one of the many possible embodiments in which my invention may take form, and desire that the drawings shall be considered as illustrating the invention rather than limiting the same.

In these drawings,

Fig. 2 is a sectional view of a valve mechanism;

Fig. 3 is a view taken on the line 3—3 of Fig. 1, showing the pressure-control mechanism; and Fig. 4 is a section on the line 4—4 of Fig. 2.

Figure 1:
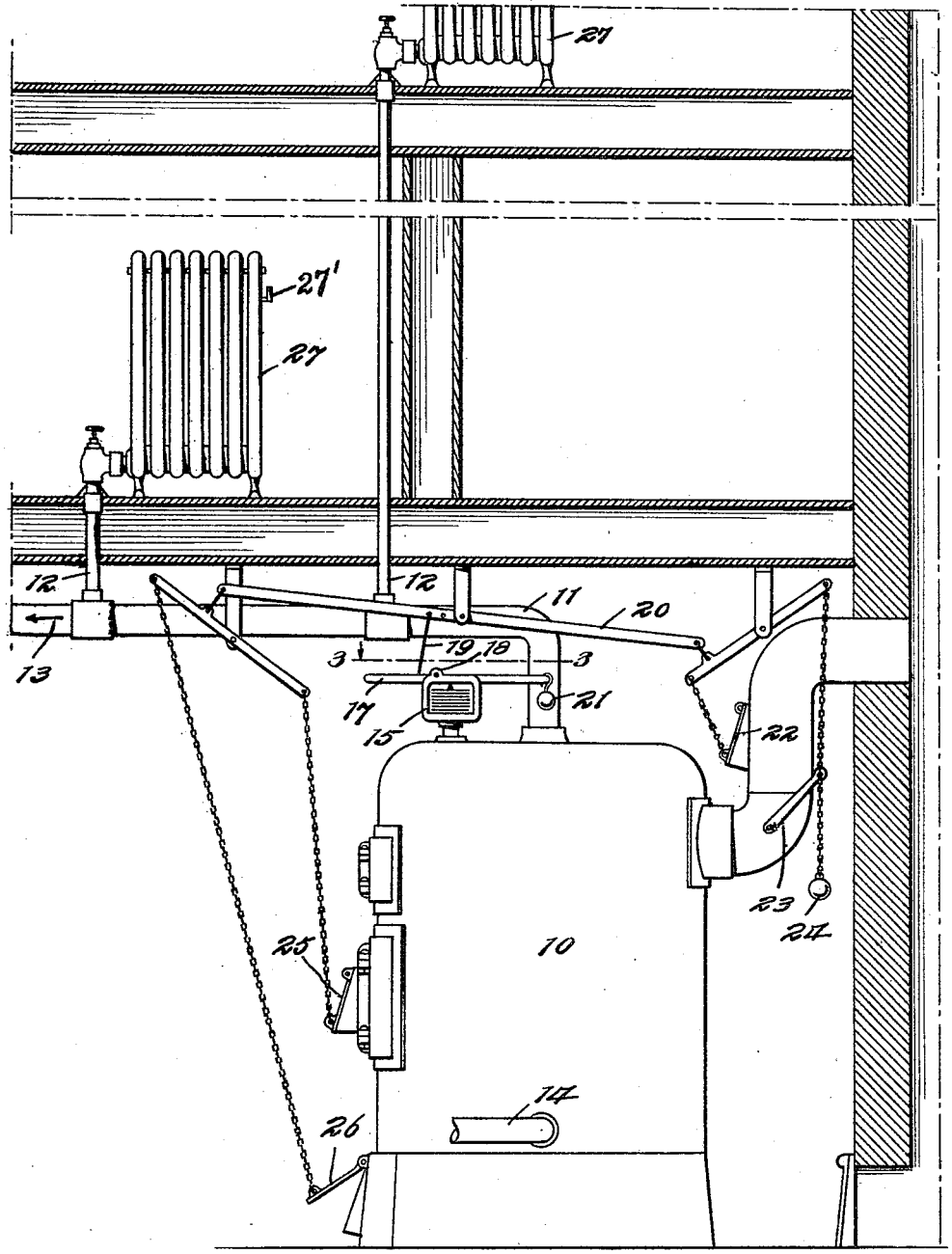
Figure 1 shows a complete layout of a steam heating system according to my invention.

A boiler 10 is connected with a supply pipe 11 to furnish steam to the radiators by means of risers 12 and suitable runouts. The condensate from the radiators may be conducted either directly back to the boiler through the pipe 11 or may be caused to flow in the direction of the arrow 13 through suitable pipes to the return connection 14.

On top of the boiler I preferably arrange two pressure regulators which may be of the metal diaphragm type. These regulators 15 and 16 are connected to a frame 17 suitably pivoted as at 18. This frame is connected by a link 19 to a long rocker arm 20 which is adapted to operate the dampers, and thereby control the fire under the boiler. A balance weight 21 is removably fastened to the frame 17 either at the right or at the left according to the pressure desired. One end of the lever 20 is connected as shown to operate the check damper 22 and the choke damper 23, a balance weight 24 being provided to balance this part of the lever system. The other end of the lever 20 is connected through levers and chains, as shown, to operate the check damper 25 in the fire door, and the draft damper 26 in the ash-pit door. With the system of dampers and pressure regulator above described, I am able to operate the furnace to give any pressure up to, say, 5 pounds per square inch with the weight 21 in the position shown. When, however, the weight is moved (as indicated in dotted lines in Fig. 3) to the other end of the frame 17, the fire will be immediately choked and the boiler will then operate to deliver a vapor under a pressure of 5 ounces.

The risers 12 or the runouts, are connected through a special valve mechanism to radiators 27. These radiators are the ordinary type used in single pipe systems, are bottom connected and have thermostatic air valves 27'. They are adapted to receive the full pressure of 5 pounds, as is customary in single pipe pressure systems when the boiler is delivering this pressure.

One form of valve mechanism is shown in detail in Fig. 2. A horizontal pipe or runout 28 is shown beneath the floor 29 which supports the radiator 27, and the usual elbow 30 is connected at one end to this horizontal pipe. This elbow is not necessary where the steam is supplied to the radiator from a vertical pipe such as the riser indicated in Fig. 1, leading to the second floor. The other end of the elbow provides the means for the introduction of steam to the valve mechanism and for the reception of the condensate formed in the radiator after it has passed through the valve mechanism. The valve is connected to the radiator 27 by means of a spud 34 and a nut 35, which are parts of the valve and are used in the usual manner.

The extreme upper part of the valve mechanism includes a variable opening valve 37 provided with an external handle 36 and adapted to vary the flow of steam from a steam passage 38 on the steam supply side through an aperture 38' in a diaphragm 38'' in the valve casing A into a passage 39 which communicates with the radiator.

The diaphragm also provides a lower passage 40 which is underneath the steam passage 39 and is adapted to receive the condensate from the radiator, a short tube 41 being provided if desired. The intermediate part of the condensate passage is curved as shown at 42 where it passes underneath he valve 37 so as to communicate with a vertical tube 43 connected to a perforate projection 43' in the diaphragm, the tube being adapted to continue the separation of the returned condensate from the incoming steam. The lower end of the tube 43 of the condensate passage is connected with a fitting 44. The movable parts 46 and 47 of a pendulum valve are pivoted at 45 on this fitting. The member 47 is loosely mounted in the pendulum 46, and has a cone head 48 adapted to rest in a conical seat 49 in the fitting 44.

The separate steam passage 38 of the valve mechanism continues downwardly as far as the condensate passage, that is, there is no contact between the heating medium and condensate throughout a distance determined by the length of the condensate passage. The lower portion of the valve mechanism may comprise any suitable means to connect elbow 30, or the riser, with the mechanism above the floor. In the form shown in the drawings, a suitable fitting 31 having a spud 32 is shown as being coupled to the upper mechanism by means of a nut 33.

By merely loosening the nuts 33 and 35 all parts of the valve mechanism are accessible for inspection or repairs.

When the boiler is delivering steam at an appreciable pressure, and the valve 37 is opened to permit the radiator to become heated, steam at full pressure fills the steam passages 38 and 39, the radiator 27, tube 41 and condensate passage 40 except for the space required by the condensate formed in the radiator. The air in the radiator escapes through the valve 27'. The condensate will flow freely through the tube 41, passage 40, tube 43, and pass through the hole 49 into the steam pipe 28. There will be no accumulation of this condensate because pressure balance maintains without any such accumulation.

When the valve 37 is closed, the steam pressure will operate against the left side of the pendulum valve and close it. No steam can then be admitted to the radiator.

The above operation is substantially the same as that of the single pipe pressure system now in common use, the whole radiator being filled with steam at full pressure, or being cold.

When, however, the boiler is delivering a vapor, and in my system this state can be readily attained by merely shifting the balance weight 21, the system has all the advantages of the modulating two-pipe system. The valve 37 may be partly closed so as to throttle the vapor as it passes through the valve to a sufficient extent to fill any desired portion of the radiator with vapor, the balance of the radiator being filled with air admitting through the air valve 27'. The air and vapor are substantially at atmospheric pressure. The condensate which collects in the radiator will pass through the tube 41, passage 40 and into the tube 43, where it will accumulate and form a water column of sufficient height to compensate for the difference between the vapor pressure in the runout 28 and atmospheric pressure which now exists in the radiator.

When a state of equilibrium has been reached, the pendulum valve will open sufficiently to allow the condensate to pass into the runout 28 as the valve 37 admits the vapor to the radiator.

The standard construction of radiators and buildings allows an installation in which the distance from the center of the pendulum valve to the stop of the passage 40 may be at least ten and one-half inches. A 10½ inch water column will develop a pressure of about 5½ ounces, and this pressure is comparable to that now used in vapor-heating systems. It is a pressure at which great economies in operation are available.

With an installation such as I have described in detail, when starting up the fires in the morning, I place the weight 21 in the position shown. The boiler will then deliver steam at 5 pounds pressure which will quickly heat the building to the desired temperature. When this temperature has been reached, I place the weight 21 on the other end of lever 17 so that the boiler will deliver a vapor at about 5 ounces pressure. This permits modulating or regulating the amount of vapor to be supplied to the radiator and the consequent amount of heating surface in operation. This modulation is attained by simply moving the valve handle precisely as in the high-priced two-pipe modulating systems now in general use. The device takes care of itself so that there is no accumulation of water to cause an annoying hammering of the radiators.

I claim:

1. A valve mechanism for controlling the heating of steam radiators, comprising a steam passage, means to vary the size of the orifice therethrough to control the admission of steam to the radiator, a condensate passage extending from the radiator the full length of the steam passage, said condensate passage being in part inside the steam passage and independent of said means, and a valve for controlling the flow of condensate from the condensate passage to the steam passage and preventing the flow of steam into the condensate passage.

2. A multiple passage valve mechanism for modulating the heating of a steam radiator in which the pressure is atmospheric, said mechanism comprising means to vary the flow of steam through one of the passages, the other passage being unobstructed adjacent to said means and extending below the same to provide a condensate collecting chamber of a depth sufficient to accumulate condensate to have a hydrostatic pressure equal to that of steam vapor in the steam passage, and a valve which opens in response to hydrostatic pressure of accumulated condensate in the condensate passage and closes when the hydrostatic pressure is overcome by the pressure of the steam vapor in the steam passage.

3. A valve mechanism for modulating the heating of a steam radiator in which the pressure is atmospheric, comprising, a variable opening steam admission valve, a steam passage for leading steam to the valve a second steam passage for leading steam from the valve to the radiator, a condensate return passage having a portion alongside the second steam passage and extending past the valve and another portion which extends interiorly of the first steam passage, and a valve at the lower end of the latter mentioned portion of the condensate passage, which valve opens in response to hydrostatic pressure of accumulated condensate in the condensate passage and closes when the hyrdostatic pressure is overcome by the steam pressure in the first steam passage.

4. A valve mechanism for modulating the heating of a steam radiator in which the pressure is atmospheric, comprising, a variable opening steam admission valve, a steam passage for leading steam to the valve, a second steam passage for leading steam from the valve to the radiator, a condensate return passage having a portion underneath the second steam passage and the valve and another portion which extends interiorly of the first steam passage, and an outwardly opening pendulum valve at the lower end of the latter mentioned portion of the condensate passage, which valve opens in response to hydrostatic pressure of accumulated condensate in the condensate passage and closes when the hydrostatic pressure is overcome by the steam pressure in the first steam passage.

5. In a valve mechanism for controlling the heating of steam radiators, a casing one of whose ends is provided with means for connecting the casing to a pipe, a diaphragm dividing the interior of the casing into a steam passage and a condensate passage, a variable opening valve interposed in the steam passage, a perforate projection on the diaphragm into which the condensate passage leads, a tube fastened to the projection to continue the condensate passage, and a pendulum valve carried by the other end of the tube for controlling the flow through the condensate passage.

6. A valve mechanism for controlling the flow of steam to a radiator and the return of condensate therefrom, comprising, a casing having a diaphragm dividing the interior of the casing into a steam passage and a condensate passage, a variable opening valve interposed in the steam passage, the condensate passage terminating in a perforate projection carried by the diaphragm, a tube coupled with the projection, and an outwardly opening check valve on the other end of the tube.

7. A valve mechanism for controlling the flow of steam from a vertical pipe and the return of condensate to said pipe, comprising, a casing one end of which is provided with means for connecting the casing to the vertical pipe, a diaphragm dividing the interior of the casing into a steam passage and a condensate passage, a variable opening valve interposed in the steam passage, the condensate passage terminating in a perforate projection carried on the diaphragm adjacent to the pipe connecting means, a tube carried by the projection and adapted to continue the condensate passage within the pipe, and an outwardly opening valve at the end of the tube whereby condensate may return to the pipe and the ingress of steam is prevented.

8. A controlling mechanism for steam radiators having one end thereof connectible to a radiator and the other end connectible to a steam supply line, said mechanism being provided with a steam passage, and means to vary the orifice therein, and further provided with a separate return passage for the condensate extending from the radiator connectible end to the steam supply line connectible end, said condensate passage including a vertical tube and a valve at the lower end of the vertical tube.

9. In a radiator valve, a casing having a steam passage associated with means for varying the opening therethrough, said casing also having a separate condensate passage which passage is associated with casing supported means for automatically maintaining a water column that will compensate for the difference between the pressure in the supply line and the pressure in the radiator when said steam passage is reduced for modulation and thereby permit the flow of condensate into said supply line notwithstanding said pressure difference, said casing-supported means having a valve at the lower end thereof whereby the ingress of steam is prevented.

10. A modulating valve unit for a single pipe modulating steam heating system, said unit having a steam passage, means for varying the size of the orifice therethrough whereby the steam may be throttled, means to collect condensate to thereby automatically compensate for the difference between the pressure in the supply line and the pressure in the radiator when said first mentioned means is manipulated to throttle the steam for modulation, said last mentioned means including a condensate passage independent of the steam passage, and devices for preventing the ingress of steam to the lower end of the condensate passage, said unit being further provided with coupling devices adapted to secure it to a radiator and a steam supply pipe.

MOSES G. HUBBARD.